Patented Aug. 23, 1932

1,873,277

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

AZO DYES ADAPTED FOR DYEING REGENERATED CELLULOSE MATERIALS

No Drawing. Application filed February 19, 1930, Serial No. 429,809, and in Great Britain February 25, 1929.

In my British Patents Nos. 329,014 and 333,239, I have described blue or violet disazo dyestuffs which are valuable for the dyeing of a regenerated cellulose rayon, as for instance, a viscose rayon, and which are obtained by coupling p-nitroaniline with specified coupling components, reducing the nitro azo dyestuff thus obtained, diazotizing and coupling with a 1:8- or 2:8-aminonaphthol sulphonic acid. The dyeings obtained are characterized by their evenness of shade. I have now found that certain disazo dyes which are obtained from m-nitroaniline or its molecular substituted derivatives by similar means possess the like valuable property of dyeing a regenerated cellulose rayon in even shades.

By this invention such azo dyes are obtained by coupling meta-nitroaniline or a nuclear substituted derivative thereof with a phenol or naphthol or a sulphonic or carboxylic acid derivative thereof, or with an N-substituted aminonaphthol sulphonic acid, reducing the nitro azo dyestuff produced, diazotizing the resultant aminoazo compound and coupling with a coupling component, including an azo coupling compound. According to the components used there are obtained dyestuffs giving yellow or red to violet or blue shades on viscose rayon. Alternatively we may for instance couple a meta-aminoacetanilide or its corresponding nuclear substituted derivatives with the aforesaid coupling components, hydrolyze the acylamino azo compound thus obtained and diazotize and couple with a coupling component the resultant aminoazo dyestuff.

My new disazo dyes may be generically represented by the probable formula:

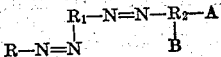

wherein $R_1$ represents a benzene residue, $R_2$ represents a benzene or naphthalene residue, R represents a coupled residue of an azo dye coupling component, A represents a $COOH$ or $SO_3H$ group and B represents hydrogen, an amino or substituted amino group, and in which azo groups attached to $R_1$ are in the meta-position with respect to each other. Within the above class of compounds there are many subgeneric classes. Some of these subgeneric classes are as follows:

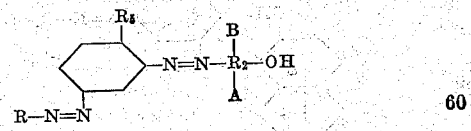

wherein $R_2$ represents a benzene or naphthalene residue, $R_5$ represents hydrogen, an alkyl or alkoxy group, R represents a coupled residue of an azo dye coupling component, A represents a $COOH$ or $SO_3H$ group and B represents hydrogen or an amino or substituted amino group. In the following formulæ the various symbols used have the same definitions as set forth ante; and the additional symbols are defined as follows: $R_3$ represents a naphthalene nucleus and $R_7$ represents hydrogen, aryl or acyl group.

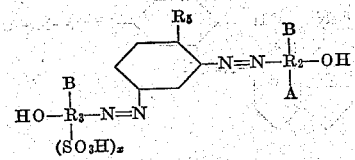

wherein $x$ is 1 or 2

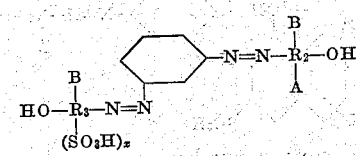

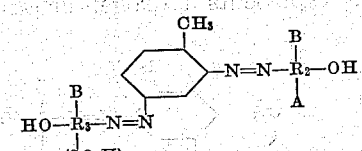

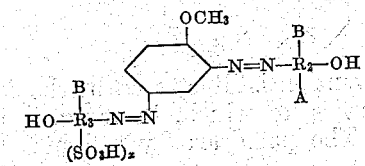

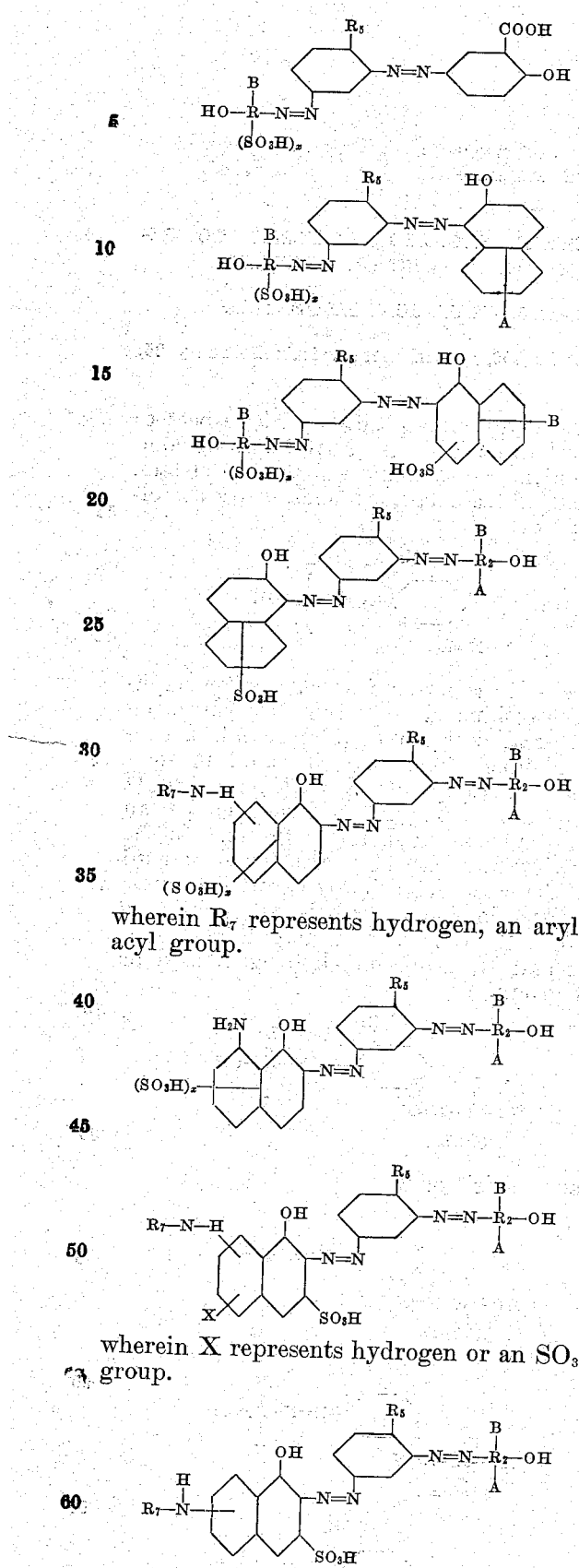

wherein $R_7$ represents hydrogen, an aryl or acyl group.

wherein X represents hydrogen or an $SO_3H$ group.

The invention is illustrated by the following examples, to which, however, it is not limited. The parts are by weight:

*Example 1*

138 parts of meta-nitroaniline are diazotized with 250 parts of 36% hydrochloric acid and 69 parts of sodium nitrite in the known manner and the disazo solution is run into a solution of 160 parts of sodium salicylate containing 400 parts of sodium carbonate. After stirring until combination is complete the coupling is heated up and the dyestuff reduced by the addition of a solution containing 360 parts of sodium sulphide crystals. The mixture is stirred until reduction is complete when it is made neutral by the addition of hydrochloric acid and the dyestuff precipitated by adding common salt. The aminoazo dyestuff is filtered off, dissolved in hot water, cooled and diazotized with 300 parts of 36% hydrochloric acid and about 69 parts of sodium nitrite. The mixture is stirred until diazotization is complete when the diazo suspension is run into a solution of 337 parts of sodium salt of 2-phenylamino-5-naphthol-7-sulphonic acid containing 500 parts of sodium carbonate. The coupling is maintained cold and alkaline, and after stirring until combination is complete it is heated up and the dyestuff salted out with common salt. It dyes viscose rayon an orange red shade. If in place of the sodium salt of 2-phenylamino-5-naphthol-7-sulphonic acid there is added a solution containing 315 parts of 2-phenylamino-8-naphthol-6-sulphonic acid there is obtained a dyestuff dyeing viscose rayon a brown shade of good fastness to acids.

*Example 2*

138 parts of meta-nitroaniline are diazotized, coupled with 138 parts of salicylic acid, and the resultant azo dyestuffs is successively reduced and diazotized as described in Example 1. The diazo suspension thus obtained is stirred into a neutral solution of the monoazo dyestuff obtained by coupling 138 parts of diazotized p-nitroaniline with 319 parts of 1:8-aminonaphthol-3:6-disulphonic acid in acid solution in the known manner, to which 500 parts of sodium carbonate have subsequently been added. The mixture is maintained cold and alkaline and is stirred until coupling is complete, when the mixture is heated up and the dyestuff isolated by the addition of common salt. It dyes viscose rayon a greenish blue shade of good fastness to acids.

*Example 3*

168 parts of 4-nitro-2-anisidine are diazotized in the known manner with 69 parts of sodium nitrite and 250 parts of 36% hydrochloric acid. The diazo solution is run into a solution containing 315 parts of 2-phenylamino-8-naphthol-6-sulphonic acid and 400 parts of sodium carbonate. The mixture is maintained faintly alkaline and stirred until coupling is complete when it is heated up and there is run in a solution containing about 360 parts of sodium sulphide crystals. The mixture is stirred until reduction is complete when it is made neutral and the aminoazo dyestuff precipitated by the addition of common salt and filtered off. The aminoazo dyestuff is dissolved in hot water, cooled and diazotized with 300 parts of 36% hydrochloric acid and about 69 parts of sodium nitrite. The diazo suspension thus obtained is stirred into a well cooled solution containing 319 parts of 1:8-amino-naphthol-3:6-disulphonic acid and 500 parts of sodium carbonate. The coupling is stirred until combination is complete when it is heated up and the dyestuff isolated by the addition of common salt. It dyes viscose rayon a blue shade.

The invention is further illustrated by the examples shown in the following table:

| Nitroazo dyestuffs | | Reduced, diazotized and coupled with— | Shade on viscose rayon |
|---|---|---|---|
| From 1:3-diamine | and | | |
| m-nitroaniline | 2-phenylamino-8-naphthol-6-sulphonic acid (alkaline coupled). | m-phenylene diamine | Yellowish-brown |
| m-nitroaniline | N. W.-acid | 2-amino-8-naphthol-6-sulphonic acid (acid coupled). | Red |
| m-nitroaniline | β-oxynaphthoic acid | 1:8-aminonaphthol-2:4-disulphonic acid (alkaline coupled). | Bluish-red |
| m-nitroaniline | N. W.-acid | 1:8-aminonaphthol-2:4-disulphonic acid (alkaline coupled). | Reddish-violet |
| m-nitroaniline | 2-phenylamino-5-naphthol-7-sulphonic acid (alkaline coupled). | 1-amino-8-naphthol-4-sulphonic acid (alkaline coupled). | Bluish-red |
| m-nitroaniline | Salicylic acid | Benzoyl-2:8-amino-naphthol-6-sulphonic acid | Orange |
| m-aminoacetanilide | Salicylic acid | Benzoyl-2:5-amino naphthol-7-sulphonic acid | Orange |
| m-nitroaniline | 1-naphthol-4-sulphonic acid | Benzoyl-2:8-amino-naphthol-6-sulphonic acid | Bluish-red |
| 4-nitro-2-anisidine | 2-naphthol-7-sulphonic acid | 1:8-aminonaphthol-3:6-disulphonic acid | Violet |
| m-nitroaniline | Salicylic acid | 2-naphthol-6-sulphonic acid | Orange |
| 4-nitro-o-toluidine | 2-phenylamino-8-naphthol-6-sulphonic acid. | 1:8-aminonaphthol-3:6-disulphonic acid | Brownish-violet |
| m-nitroaniline | Salicylic acid | 1-amino-5-naphthol-7-sulphonic acid | Maroon |

Having now particularly described and ascertained the nature of my said invention and in what manner the same is to be performed, I declare that what I claim is:

1. As new products, disazo dyes having in the form of the free acid the probable formula:

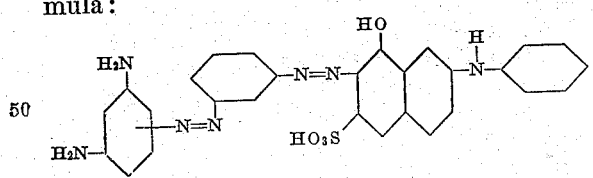

the said disazo dyes being capable of dyeing regenerated cellulose in even level yellowish-brown shades.

2. As new products, disazo dyes having in the form of the free acid the probable formula:

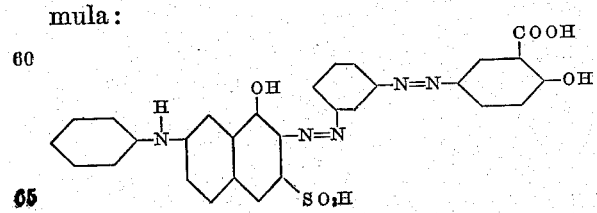

the said disazo dyes being capable of dyeing regenerated cellulose in even level brown shades.

3. As new products disazo dyes having in the form of the free acid the probable formula:

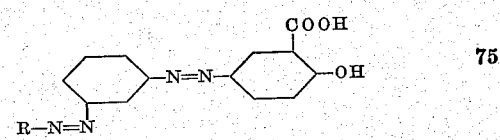

wherein R represents the coupled residue of an azo dye coupling component of the class consisting of benzoyl-2:8-amino-naphthol-6-sulphonic acid and 2-phenylamino-8-naphthol-6-sulphonic acid, said disazo dyes being capable of dyeing regenerated cellulose in even level shades.

4. As new products disazo dyes having in the form of the free acid the probable formula:

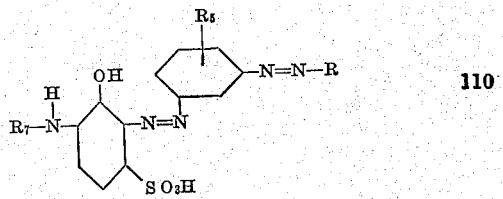

wherein R represents the coupled residue of an azo dye coupling component of the class consisting of salicylic acid and meta-phenylene diamine, $R_5$ represents hydrogen, methyl or methoxy group, and $R_7$ represents a phenyl or benzoyl group, said disazo dyes being capable of dyeing regenerated cellulose in even level shades.

In testimony whereof I affix my signature.

RAINALD BRIGHTMAN.

Certificate of Correction

Patent No. 1,873,277.

August 23, 1932.

RAINALD BRIGHTMAN

It is hereby certified that error appears in the printed specification of the above-numbered patent requiring correction as follows: Page 3, lines 107 to 114, claim 4, strike out the formula and insert instead:

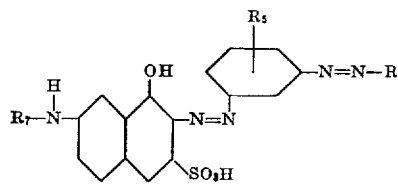

and that the said Letters Patent should be read with this correction therein that the same may conform to the record of the case in the Patent Office.

Signed and sealed this 11th day of October, A. D. 1932.

[SEAL.]

M. J. MOORE,
*Acting Commissioner of Patents.*